US009723421B2

(12) United States Patent
Hwang et al.

(10) Patent No.: US 9,723,421 B2
(45) Date of Patent: Aug. 1, 2017

(54) ELECTRONIC DEVICE AND METHOD FOR CONTROLLING VIDEO FUNCTION AND CALL FUNCTION THEREFOR

(71) Applicant: Samsung Electronics Co., Ltd., Gyeonggi-do (KR)

(72) Inventors: Sooji Hwang, Gyeonggi-do (KR); Kyungtae Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 190 days.

(21) Appl. No.: 14/638,633

(22) Filed: Mar. 4, 2015

(65) Prior Publication Data
US 2015/0256955 A1 Sep. 10, 2015

(30) Foreign Application Priority Data

Mar. 4, 2014 (KR) .................. 10-2014-0025717

(51) Int. Cl.
H04R 29/00 (2006.01)
H04M 1/60 (2006.01)
H04M 1/656 (2006.01)
H04M 1/725 (2006.01)
H04N 7/14 (2006.01)
G10L 21/0208 (2013.01)
G10L 21/0272 (2013.01)

(52) U.S. Cl.
CPC ........ *H04R 29/004* (2013.01); *H04M 1/6008* (2013.01); *H04M 1/656* (2013.01); *H04M 1/72583* (2013.01); *H04N 7/147* (2013.01); *G10L 21/0208* (2013.01); *G10L 21/0272* (2013.01); *H04M 2250/52* (2013.01)

(58) Field of Classification Search
CPC .... H04R 29/00; H04R 29/004; H04R 29/005; H04R 29/006; H04R 2499/11
USPC ...................................... 381/56, 58
See application file for complete search history.

(56) References Cited

U.S. PATENT DOCUMENTS

| 6,321,078 | B1 * | 11/2001 | Menelli | ................. | H04L 12/14 |
| | | | | | 379/130 |
| 7,742,746 | B2 | 6/2010 | Xiang et al. | | |
| 8,175,871 | B2 | 5/2012 | Wang et al. | | |
| 2010/0137027 | A1 * | 6/2010 | Kim | ................. | G06F 3/03547 |
| | | | | | 455/556.1 |
| 2012/0140943 | A1 * | 6/2012 | Hendrix | ............ | G10K 11/1782 |
| | | | | | 381/71.11 |

FOREIGN PATENT DOCUMENTS

| EP | 0 792 077 | 8/1997 |
| JP | 11-75280 | 3/1999 |
| KR | 100132888 | 12/1997 |
| KR | 1020060037916 | 5/2006 |
| KR | 100664271 | 12/2006 |

* cited by examiner

*Primary Examiner* — Paul S Kim
*Assistant Examiner* — Katherine Faley
(74) *Attorney, Agent, or Firm* — The Farrell Law Firm, P.C.

(57) ABSTRACT

A method for controlling an electronic device is provided. The method for controlling an electronic device includes operating a first microphone and a second microphone; receiving a first voice signal picked up by the first microphone and a second voice signal picked up by the second microphone; selecting at least one voice signal; storing the selected at least one voice signal; and sending the second voice signal picked up by the second microphone to a communication module.

14 Claims, 13 Drawing Sheets

ELECTRONIC DEVICE AND METHOD FOR CONTROLLING VIDEO FUNCTION AND CALL FUNCTION THEREFOR

PRIORITY

This application claims priority under 35 U.S.C. §119(a) to a Korean Patent Application filed on Mar. 4, 2014 in the Korean Intellectual Property Office and assigned Serial No. 10-2014-0025717, the entire content of which is incorporated herein by reference.

BACKGROUND

1. Field of the Invention

The present invention generally relates to an electronic device and method for controlling video and call functions therefor.

2. Description of the Related Art

In recent years, electronic devices have evolved into integrated multimedia players supporting a variety of functions such as still or moving image capture, music, video or multimedia playback, gaming, broadcast reception, and navigation assistance.

To realize complex functions, various hardware and software features have been introduced to electronic devices. For example, electronic devices may be equipped with various types of user interfaces (UI) enabling users to perform selections and searches.

Such an electronic device enables the user to place and receive calls (call function) while in motion and to send and receive text or image information (data communication function). The electronic device may also support a video call function using an installed camera module. That is, the user of a camera-equipped electronic device may capture a still or moving image of the face or desired scene and send the captured image to another electronic device through an electronic mail.

However, when an incoming call arrives while the electronic device is performing video or voice recording, the user may have to stop the video or voice recording to answer the call.

SUMMARY

The present invention has been made to solve at least the above-mentioned problems and/or disadvantages and to provide at least the advantages described below.

Accordingly, an aspect of the present invention is to provide an electronic device that can execute video and call functions at the same time without interference between voice signals and distortion thereof by selectively controlling voice signals through multiprocessing.

In accordance with an aspect of the present invention, a method for controlling an electronic device is provided. The method includes operating a first microphone and a second microphone; receiving a first voice signal picked up by the first microphone and a second voice signal picked up by the second microphone; selecting at least one voice signal; storing the selected at least one voice signal; and sending the second voice signal picked up by the second microphone to a communication module.

In accordance with another aspect of the present invention, an electronic device is provided. The electronic device includes a sensor unit configured to identify the position of a user; a memory unit configured to store audio signals and moving images; an input unit having a first microphone configured to pick up a first voice signal for recording a video and a second microphone configured to pick up a second voice signal of the user; a camera unit having a first camera configured to capture an image at a back of the electronic device and a second camera configured to capture an image at a front of the electronic device; an output unit having a display module configured to display screens for a video recording mode, a call mode and a video call mode; and a processor unit configured to control a wireless communication unit having a mobile communication module and a wireless Internet module for video and voice communication between the electronic device and an external electronic device, wherein the processor unit includes a sound manager that is configured to operate the first microphone and the second microphone, receive the first voice signal from the first microphone and receive the second voice signal from the second microphone, select at least one voice signal, store the selected at least one voice signal, and control the wireless communication unit to send the second voice signal received from the second microphone to a communication module.

BRIEF DESCRIPTION OF THE DRAWINGS

The above and other aspects, features, and advantages of certain embodiments of the present invention will be more apparent from the following detailed description, taken in conjunction with the accompanying drawings, in which.

DETAILED DESCRIPTION OF EMBODIMENTS OF THE PRESENT INVENTION

Figure 1:
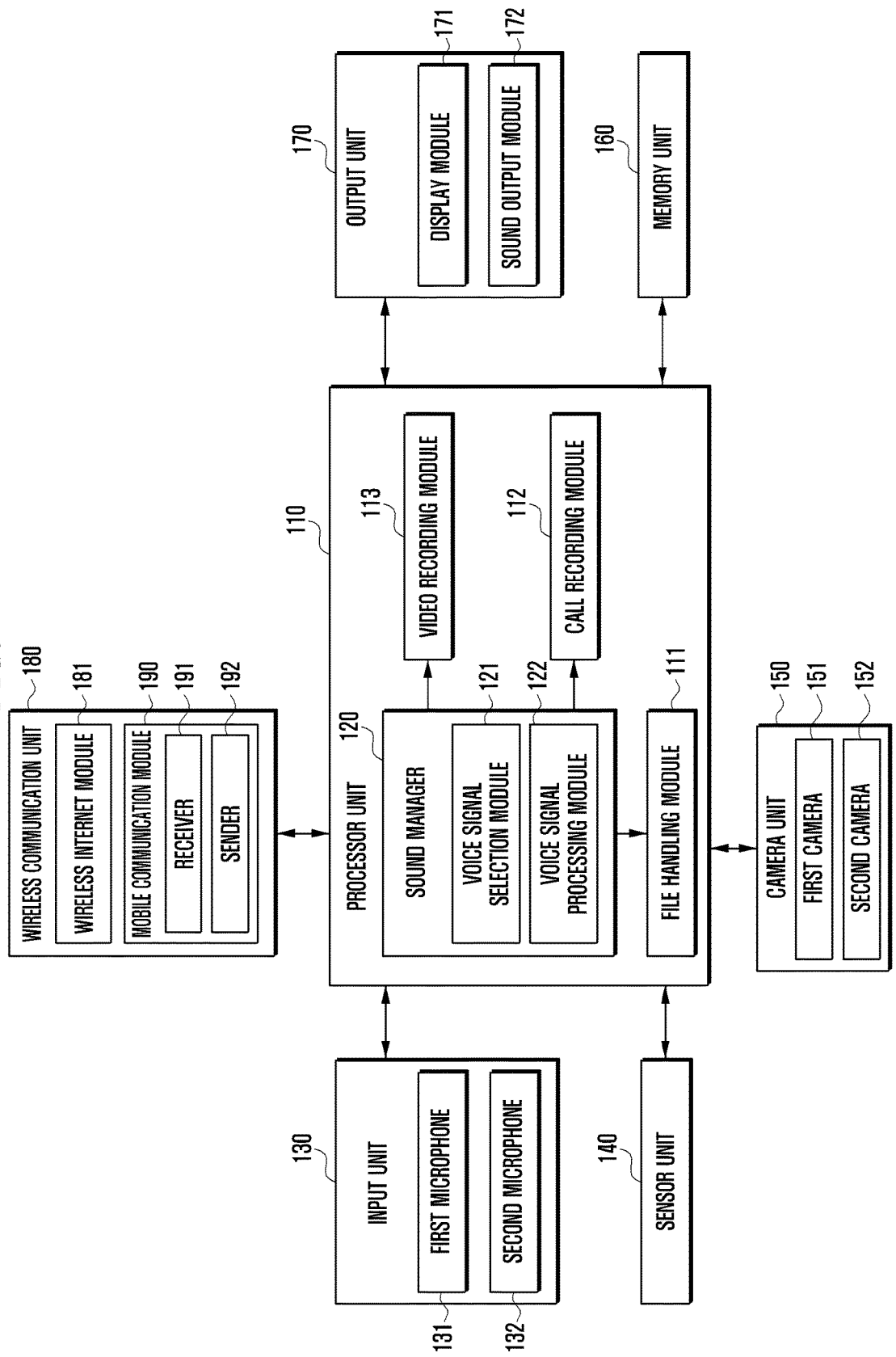
FIG. 1 is a block diagram of a configuration of an electronic device according to an embodiment of the present invention.

Hereinafter, various embodiments of the present invention are described in detail with reference to the accompanying drawings. The same reference symbols are used throughout the drawings to refer to the same or like parts. Detailed descriptions of well-known functions and structures incorporated herein may be omitted to avoid obscuring the subject matter of the present invention. The descriptions of the various embodiments are to be construed as examples only and do not describe every possible instance of the present invention.

In the following description, the term "module" may refer to a software component, a hardware component, a firmware component, or a combination thereof. The term "module" may be used interchangeably with "unit", "logic", "logical block", "component", "circuit", or the like. A module may be a smallest element or a part thereof acting as a single entity. A module may be a smallest element or a part thereof supporting one or more functions. A module may be implemented mechanically or electronically. For example, a module having a specific function may be implemented using at least one of an Application-Specific Integrated Circuit (ASIC), a Field-Programmable Gate Array (FPGA), and a Programmable-Logic Device (PLD).

An electronic device according to an embodiment of the present invention may be a device including a communication function. For example, the electronic device may include at least one or a combination of at least one of a smart phone, a tablet Personal Computer (PC), a mobile phone, a video phone, an e-book reader, a desktop PC, a laptop PC, a netbook computer, a Personal Digital Assistant (PDA), a Portable Multimedia Player (PMP), an Moving Picture Expert Group (MPEG) Audio Layer 3 (MP3) player, a mobile medical device, an electronic bracelet, an electronic necklace, an electronic appcessory, a camera, a wearable device, an electronic clock, a wrist watch, home appliances (for example, an air-conditioner, a vacuum cleaner, an oven, a microwave, a washing machine, an air cleaner, and the like), an artificial intelligence robot, a TV, a Digital Video Disk (DVD) player, an audio device, various medical devices (for example, Magnetic Resonance Angiography (MRA), Magnetic Resonance Imaging (MRI), Computed Tomography (CT), a scanning machine, a ultrasonic wave device, and the like), a navigation device, a Global Positioning System (GPS) receiver, an Event Data Recorder (EDR), a Flight Data Recorder (FDR), a set-top box, a TV box (for example, Samsung HomeSync™, Apple TV™, or Google TV™), an electronic dictionary, a vehicle infotainment device, an electronic equipment for a ship (for example, navigation equipment for a ship, gyrocompass, and the like), avionics, a security device, electronic clothes, an electronic key, a camcorder, game consoles, a Head-Mounted Display (HMD), a flat panel display device, an electronic frame, an electronic album, furniture or a portion of a building/structure that includes a communication function, an electronic board, an electronic signature receiving device, a projector, and the like. It is obvious to a person skilled in the art that the electronic device according to the present invention is not limited to the above-mentioned devices.

FIG. 1 is a block diagram of a configuration of an electronic device 100 according to an embodiment of the present invention.

Referring to FIG. 1, the electronic device 100 includes a processor unit 110, an input unit 130, a sensor unit 140, a camera unit 150, a memory unit 160, an output unit 170, and a wireless communication unit 180.

The processor unit 110 receives a command from other components (e.g. input unit 130, sensor unit 140, camera unit 150, memory unit 160, output unit 170, and wireless communication unit 180), decodes the received command, and performs an operation (e.g. a calculation or data processing) corresponding to the decoded command. The processor unit 110 may include a file handling module 111, a call recording module 112, and a video recording module 113. The processor unit 110 may further include a sound manager 120.

The file handling module 111 compresses a voice signal selected and processed by the sound manager 120 to create an audio file or audio and video file. For example, audio or video data may be compressed according to the Audio Video Interleave (AVI) or MPEG-4 Part 14 (MP4) format.

The call recording module 112 records a voice signal selected and processed by the sound manager 120, when a call between the user and the counterpart user is recorded according to a user's selection or a preset feature. Here, the voice signal may include at least one of a voice signal that is generated from the counterpart user and received by a receiver 191 of a mobile communication module 190 of the wireless communication unit 180, and a voice signal input by a second microphone 132 of the input unit 130.

The video recording module 113 records a video by use of a voice signal selected and processed by the sound manager 120, when video recording is in progress or both video recording and call processing are in progress. Here, the voice signal may include at least one of a voice signal that is generated from the counterpart user and received by the receiver 191 of the mobile communication module 190, a first voice signal input by a first microphone 131 of the input unit 130, and a second voice signal input by the second microphone 132 of the input unit 130. Video recording is in progress, for example, when at least one of the first camera 151 of the camera unit 150 and the second camera 152 of the camera unit 150 is activated. Call processing is in progress, for example, when the mobile communication module 190 is activated.

The sound manager 120 may include a voice signal selection module 121 and a voice signal processing module 122.

The voice signal selection module 121 provides an interface by which a voice signal may be selected according to a user's settings or preset features. The voice signal selection module 121 transfers a processed voice signal to the call recording module 112, the video recording module 113, or a sender 192 of the mobile communication module 190. To further process a selected voice signal, the voice signal selection module 121 transfers a voice signal to be processed to the file handling module 111. The voice signal processing module 122 performs signal processing so as to remove a second voice signal input by the second microphone 132 from a first voice signal input by the first microphone 131.

For example, in response to a user's selection of a recording button for call recording, the processor unit 110 controls the voice signal selection module 121 of the sound manager 120 to select a voice signal to be processed. The voice signal selection module 121 selects a voice signal of the counterpart user received by the receiver 191 of the mobile communication module 190 and a voice signal of the user input by the second microphone 132 of the input unit 130.

The processor unit 110 controls the voice signal processing module 122 to process the voice signal of the counterpart user and the second voice signal selected as described above. The processor unit 110 controls the call recording module 112 to receive the voice signal processed by the sound manager 120.

The call recording module 112 records the processed voice signal. The processor unit 110 controls the file handling module 111 to compress the recorded voice signal. For example, the file handling module 111 may compress the recorded voice signal into a Windows Media Audio (WMA) file.

The input unit 130 may include a first microphone 131 and a second microphone 132. The input unit 130 may further include a third microphone (not shown).

The distance between the first microphone 131 and the mouth of the user may be greater than that between the second microphone 132 and the mouth of the user. When the distance between the first microphone 131 and the user is equal to that between the second microphone 132 and the user, the second microphone 132 may intensively pick up the voice signal of the user (e.g., facing towards the user for a higher capability to pick up the voice signal of the user).

The second microphone 132 may be a directional microphone, and may be placed outside the electronic device. The second microphone 132 may pick up a voice signal in the direction of the user. The second microphone 132 may be a hands-free microphone connected externally to the electronic device.

The second microphone 132 may be an ear microphone having both earphone and microphone capabilities. The first microphone 131 may receive a voice signal used for video recording. The first microphone 131 may be installed in the electronic device or may be wiredly or wirelessly connected to the electronic device.

The first microphone 131 may be omnidirectional or directional. A directional microphone may pick up a sound extensively in a particular direction. For example, when the first microphone 131 is a directional microphone, it may pick up a voice signal extensively in the direction of a target object.

The distance between the second microphone 132 and the mouth of the user may be less than that between the first microphone 131 and the mouth of the user. The first microphone 131 may be used to pick up a voice signal of a call in progress. The third microphone may be used to pick up both an external voice signal for video recording and a voice signal of a call in progress.

The sensor unit 140 may include a gesture sensor, a gyro sensor, a barometric pressure sensor, a magnetic sensor, an acceleration sensor, a grip sensor, a proximity sensor, a red, green and blue (RGB) sensor, a biometric sensor, a temperature sensor, a humidity sensor, and a face recognition sensor.

The sensor unit 140 measures physical quantities or senses operation states of the electronic device, and converts the measured or sensed result into an electrical signal. The sensor unit 140 may further include a control circuit to control one or more sensors therein. For example, the processor unit 110 may activate the face recognition sensor capable of iris or face recognition and determine whether the user is in the front or back of the electronic device on the basis of the measurement result.

The camera unit 150 may include a first camera 151 and a second camera 152.

The first camera 151 and the second camera 152 are used for taking images and videos, for face recognition, or for making a video call, and may include an image sensor (e.g. back lens), an image signal processor (ISP), and a flash light-emitting diode (LED). The first camera 151 and the second camera 152 may correspond to lenses installed at the front and back of the electronic device.

The memory unit 160 stores commands or data created or received by the processor unit 110 or the other components. The memory unit 160 may store the kernel, middleware, application programming interfaces (API), and applications. For example, the memory unit 160 may store compressed files (e.g. wma or avi files) created by the file handling module 111.

The output unit 170 may include a display module 171 and a sound output module 172. The display module 171 displays information processed by the electronic device. For example, when the electronic device is in a call mode, the display module 171 may display a call handling user interface (UI) or graphical user interface (GUI) screen. When the electronic device is in a video call or image capture mode, the display module 171 may display a UI or GUI screen having captured or received images.

As described above, the display module 171 may also be used as an element of the input unit 130. The display module 171 may be implemented using a display technology based on a liquid crystal display (LCD), a thin film transistor (TFT) LCD, organic light-emitting diodes (OLED), a flexible display, or a three-dimensional (3D) display. According to the configuration of the electronic device, two or more display modules may be used. For example, the electronic device may include not only an internal display module but also an external display module.

The sound output module 172 outputs audio data received through the wireless communication unit 180 or stored in the memory unit 160 during signal reception, call handling, recording, speech recognition, or broadcast reception. The sound output module 172 outputs an audio signal related to a function executed by the electronic device (e.g. a sound notification for message reception). The sound output module 172 may include a speaker and a buzzer.

The wireless communication unit 180 performs communication with another electronic device. The wireless communication unit 180 may include a wireless Internet module 181 and a mobile communication module 190. The wireless Internet module 181 may support protocols for local area communication or short-range communication such as Wi-Fi, Bluetooth, and near field communication (NFC), and support various networks such as the Internet, a local area network (LAN), a wide area network (WAN), a telecommunications network, a cellular network, a satellite network, and a plain old telephone service (POTS) network. The mobile communication module 190 may include a receiver 191 and a sender 192. The receiver 191 acts as an input means to receive an audio signal from an external electronic device. The sender 192 acts as an output means to transmit an audio signal from the electronic device to an external electronic device. Here, the external electronic device may be of the same type as or a different type from the electronic device.

According to various embodiments of the present invention, a control apparatus may include an electronic device that includes a sensor unit configured to identify the position of a user, a memory unit configured to store audio signals and moving images, an input unit having a first microphone configured to pick up a first voice signal of a video and a second microphone configured to pick up a second voice signal of the user, a camera unit having a first camera configured to capture an image at the back of the electronic device and a second camera configured to capture an image at the front of the electronic device, an output unit having a display module configured to display screens for a video recording mode, a call mode, and a video call mode, and a processor unit configured to control a wireless communication unit having a mobile communication module and a wireless Internet module for video and voice communication between the electronic device and an external electronic device. The processor unit may include a sound manager that is configured to activate the first microphone and second microphone, to receive a first voice signal from the first microphone and receive a second voice signal from the second microphone, to select at least one of the voice signals, to store the selected voice signal, and to control the wireless communication unit to send the second voice signal received from the second microphone to a communication module.

Hereinafter, the voice signal picked up by the first microphone 131 is used for video recording and is referred to as the first voice signal, and the voice signal picked up by the second microphone 132 is used for a call or call recording and is referred to as the second voice signal.

Figure 2:
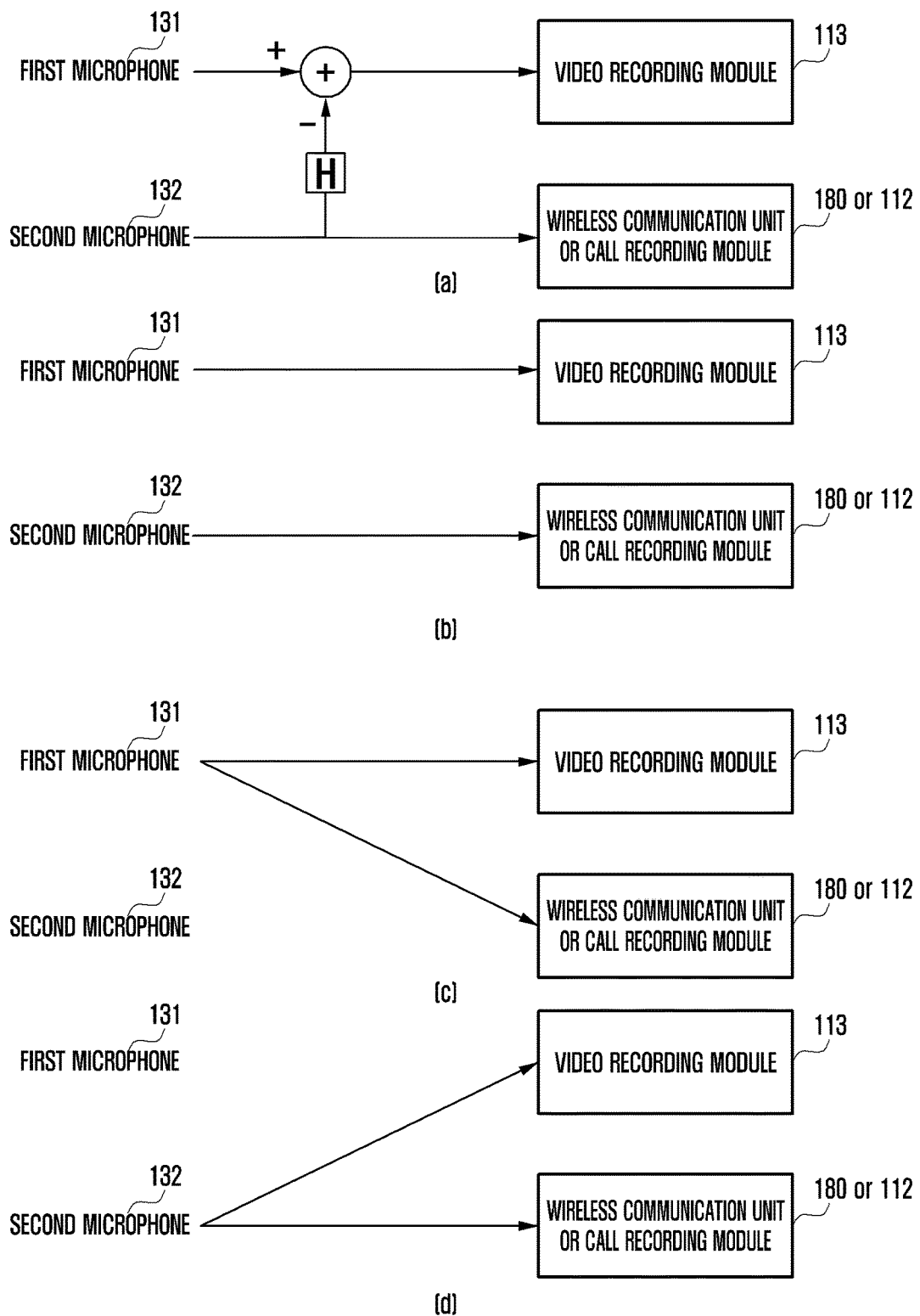
FIG. 2 illustrates schemes for voice signal processing according to an embodiment of the present invention.

FIG. 2 illustrates schemes for voice signal processing according to an embodiment of the present invention.

Part (a) of FIG. 2 depicts a scheme by which the processor unit 110 processes voice signals picked up by the first microphone 131 and the second microphone 132. Referring to part (a) of FIG. 2, the voice signal selection module 121 of the sound manager 120 selects a first voice signal received from the first microphone 131 and a second voice signal received from the second microphone 132. The voice signal processing module 122 may process the voice signals selected by the voice signal selection module 121 by use of an adaptive filter.

An adaptive filter may adjust its variable parameters so as to accurately respond to a signal of a given waveform buried in a noise. The Least Mean Square (LMS) filter is an example of the adaptive filter. Here, the second voice signal received by the second microphone 132 has a noise as a main part, while the first voice signal received by the first microphone 131 includes the effective voice signal and the noise. The voice signal processing module 122 removes the second voice signal received by the second microphone 132 from the first voice signal received by the first microphone 131 by use of the adaptive filter. The voice signal processing module 122 may use such an adaptive filter to extract an effective voice signal accurately without distortion. The voice signal selection module 121 transfers the processed voice signal to the video recording module 113. The voice signal selection module 121 transfers the second voice signal from the second microphone 132 to the wireless communication unit 180 or call recording module 112.

Part (b) of FIG. 2 depicts another scheme by which the processor unit 110 processes voice signals picked up by the first microphone 131 and the second microphone 132. Referring to part (b) of FIG. 2, the voice signal selection module 121 of the sound manager 120 selects a first voice signal received from the first microphone 131 and a second voice signal received from the second microphone 132. The voice signal selection module 121 transfers the first voice signal from the first microphone 131 to the video recording module 113. The voice signal selection module 121 transfers the second voice signal from the second microphone 132 to the wireless communication unit 180 or call recording module 112.

Part (c) of FIG. 2 depicts yet another scheme by which the processor unit 110 processes a first voice signal picked up by the first microphone 131. Referring to part (c) of FIG. 2, the voice signal selection module 121 of the sound manager 120 selects the first voice signal received from the first microphone 131. The voice signal selection module 121 transfers the first voice signal from the first microphone 131 to the video recording module 113. The voice signal selection module 121 also transfers the first voice signal from the first microphone 131 to the wireless communication unit 180 or call recording module 112.

Part (d) of FIG. 2 depicts yet another scheme by which the processor unit 110 processes a second voice signal picked up by the second microphone 132. Referring to part (d) of FIG. 2, the voice signal selection module 121 of the sound manager 120 selects the second voice signal received from the second microphone 132. The voice signal selection module 121 transfers the first voice signal from the second microphone 132 to the video recording module 113. The voice signal selection module 121 also transfers the second voice signal from the second microphone 132 to the wireless communication unit 180 or call recording module 112.

Figure 3A:
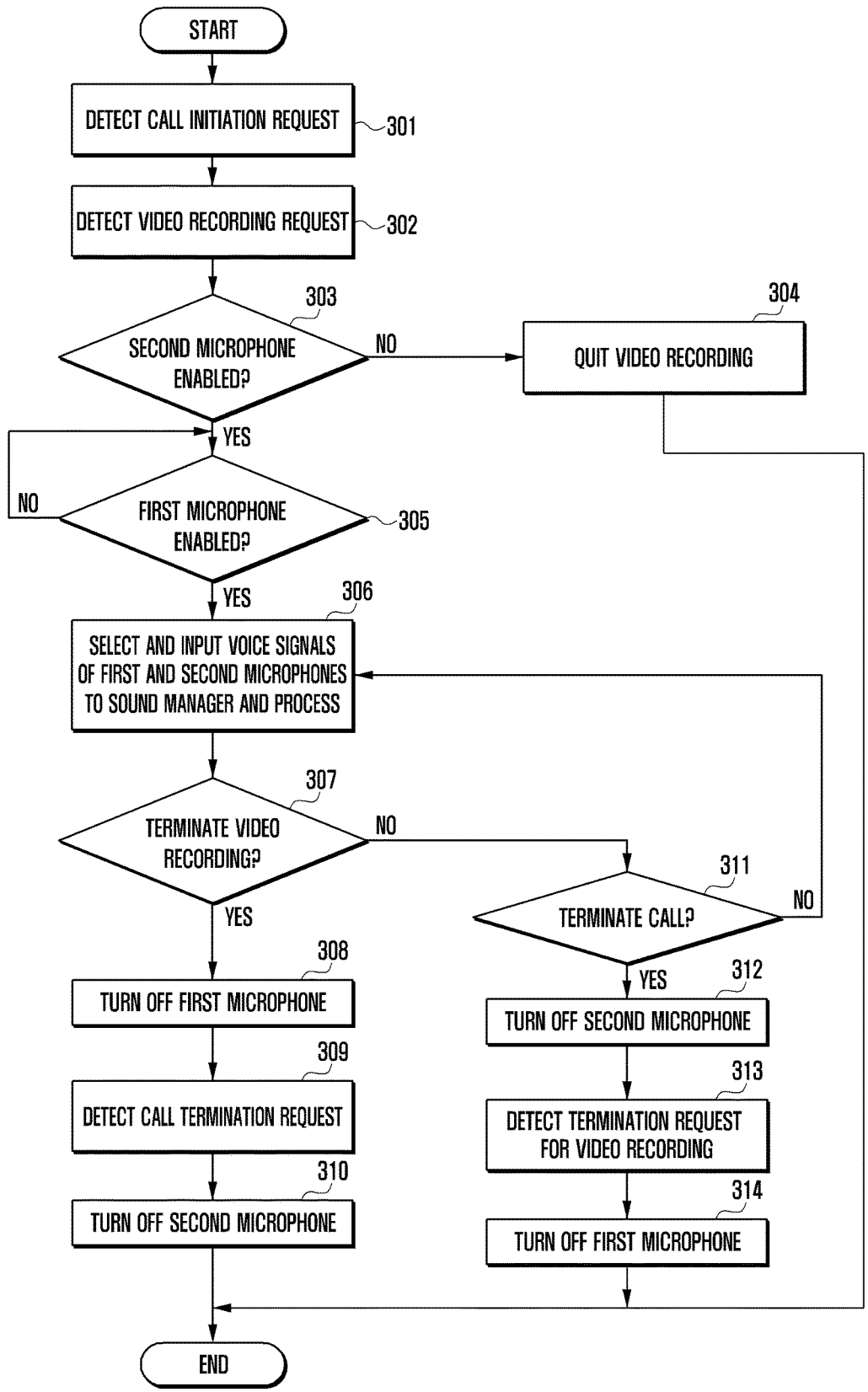
FIG. 3A is a flowchart of a method for controlling video and call functions according to an embodiment of the present invention.

FIG. 3A is a flowchart of a method for controlling video and call functions according to an embodiment of the present invention.

Referring to FIG. 3A, at operation 301, the processor unit 110 of the electronic device detects an initiation request for call placement or reception. A call initiation request may be detected upon activation of the mobile communication module 190. At operation 302, the processor unit 110 detects a request for video recording. A video recording request may be detected upon activation of the camera unit 150.

At operation 303, the processor unit 110 determines whether the second microphone 132 is enabled. If it is determined that the second microphone 132 is not enabled, at operation 304, the processor unit 110 does not operate the camera unit 150 for video recording. If it is determined that the second microphone 132 is enabled, at operation 305, the processor unit 110 determines whether the first microphone 131 is enabled.

If it is determined that the first microphone 131 is not enabled, the processor unit 110 waits for enablement of the first microphone 131. If it is determined that the first microphone 131 is enabled, at operation 306, the processor unit 110 controls the voice signal selection module 121 of the sound manager 120 to select voice signals picked up by the first microphone 131 and second microphone 132. Then, the processor unit 110 controls the voice signal processing module 122 of the sound manager 120 to process the voice signals received from the first microphone 131 and second microphone 132. Here, signal processing may be performed to remove the second voice signal, which is treated as a noise, from the first voice signal.

At operation 307, the processor unit 110 determines whether a termination request for video recording is issued. A termination request for video recording may be issued when a pause/stop button is selected on the video recording mode screen or when the camera unit 150 is deactivated.

If it is determined that a termination request for video recording is issued, the procedure proceeds to operation 308, at which the processor unit 110 turns off the first microphone 131.

At operation 309, the processor unit 110 detects a call termination request. A call termination request may be detected when a pause/stop button is selected on the call mode screen or when the mobile communication module 190 is deactivated. At operation 310, the processor unit 110 turns off the second microphone 132 and ends the procedure.

If it is determined that a termination request for video recording is not issued at operation 307, the procedure proceeds to operation 311, at which the processor unit 110 determines whether a call termination request is issued. A call termination request may be issued when a pause/stop button is selected on the call mode screen or when the mobile communication module 190 is deactivated. If it is determined that a call termination request is not issued, the procedure returns to operation 306. If it is determined that a call termination request is issued, at operation 312, the processor unit 110 turns off the second microphone 132. At operation 313, the processor unit 110 detects a termination request for video recording. A termination request for video recording may be detected when a pause/stop button is selected on the video recording mode screen or when the camera unit 150 is deactivated. At operation 314, the processor unit 110 turns off the first microphone 131 and ends the procedure.

Figure 3B:
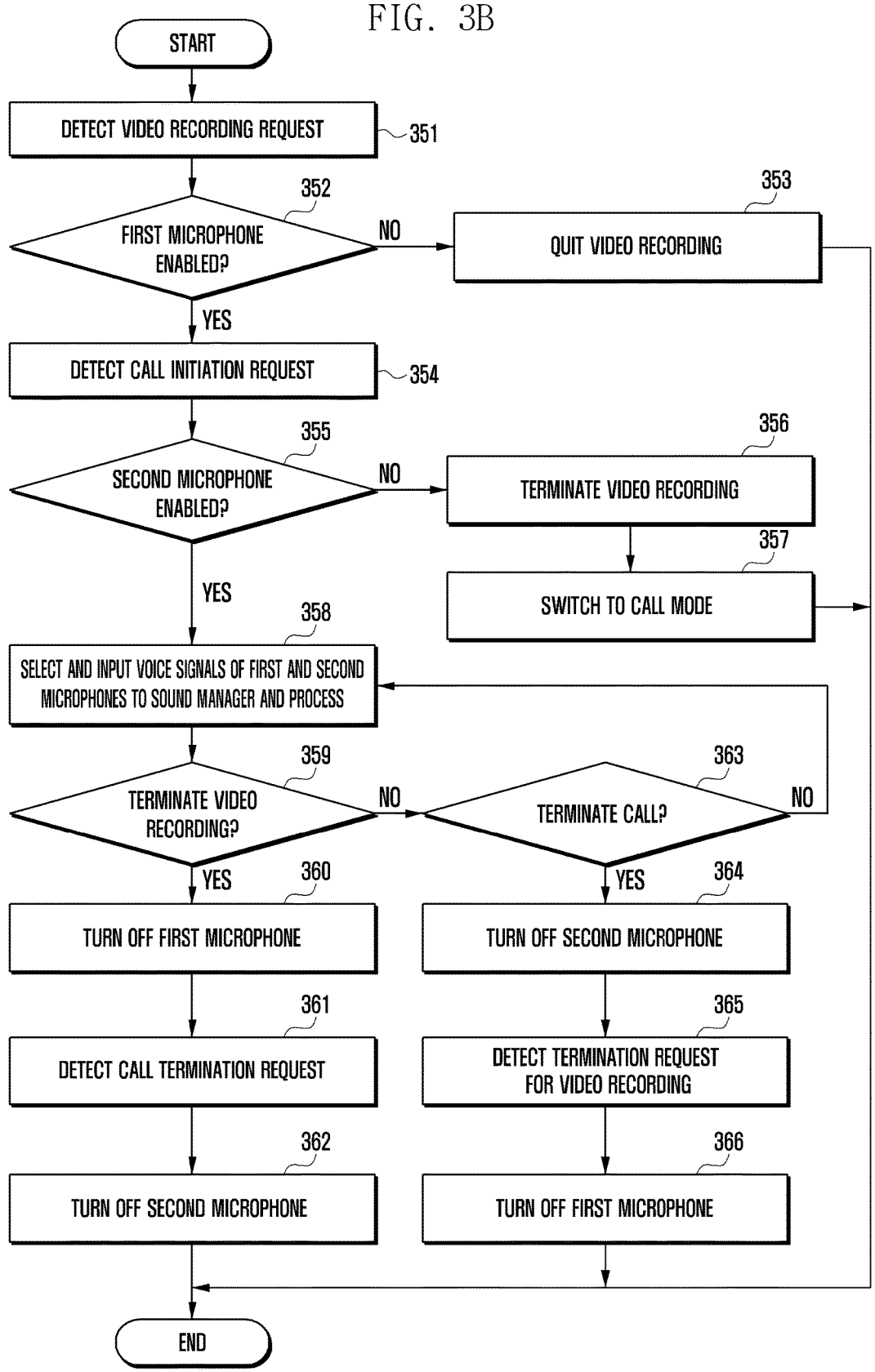
FIG. 3B is a flowchart of a method for controlling video and call functions according to another embodiment of the present invention.

FIG. 3B is a flowchart of a method for controlling video and call functions according to another embodiment of the present invention.

Referring to FIG. 3B, at operation 351, the processor unit 110 of the electronic device detects a request for video recording. At operation 352, the processor unit 110 determines whether the first microphone 131 is enabled. If it is determined that the first microphone 131 is not enabled, at operation 353, the processor unit 110 does not operate the camera module for video recording.

If it is determined that the first microphone 131 is enabled, the procedure proceeds to operation 354, at which the processor unit 110 detects an initiation request for call placement or reception. At operation 355, the processor unit 110 determines whether the second microphone 132 is enabled. If it is determined that the second microphone 132 is not enabled, the procedure proceeds to operation 356, at which the processor unit 110 controls the camera unit 150 to stop video recording.

At operation 357, the processor unit 110 switches to a call mode and controls the display module 171 to output a call mode screen.

If it is determined that the second microphone 132 is enabled, the procedure proceeds to operation 358, at which the processor unit 110 controls the voice signal selection module 121 of the sound manager 120 to select voice signals picked up by the first microphone 131 and second microphone 132. Then, the processor unit 110 controls the voice signal processing module 122 of the sound manager 120 to process the voice signals received from the first microphone 131 and second microphone 132.

At operation 359, the processor unit 110 determines whether a termination request for video recording is issued. A termination request for video recording may be issued when a pause/stop button is selected on the video recording mode screen or when the camera unit 150 is deactivated. If it is determined that a termination request for video recording is issued, the procedure proceeds to operation 360, at which the processor unit 110 turns off the first microphone 131. At operation 361, the processor unit 110 detects a call termination request. At operation 362, the processor unit 110 turns off the second microphone 132 and ends the procedure.

If it is determined that a termination request for video recording is not issued at operation 359, the procedure proceeds to operation 363, at which the processor unit 110 determines whether a call termination request is issued. A call termination request may be issued when a pause/stop button is selected on the call mode screen or when the mobile communication module 190 is deactivated. If it is determined that a call termination request is not issued, the procedure returns to operation 358.

If it is determined that a call termination request is issued, the procedure proceeds to operation 364, at which the processor unit 110 turns off the second microphone 132. At operation 365, the processor unit 110 detects a termination request for video recording. At operation 366, the processor unit 110 turns off the first microphone 131 and ends the procedure.

Figure 4:
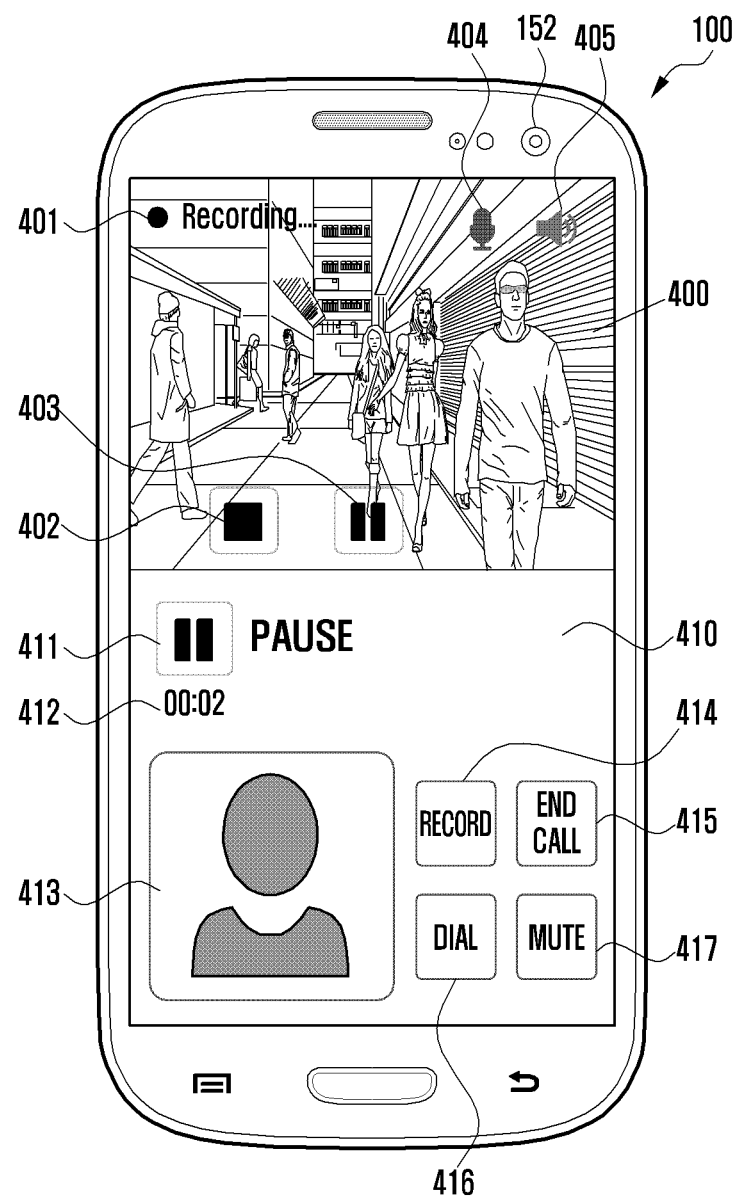
FIG. 4 is a screen representation of the electronic device according to an embodiment of the present invention.

FIG. 4 is a screen representation of the electronic device according to an embodiment of the present invention. The following description is related to video recording and call handling for easy understanding of the present invention. However, the present invention is not limited thereto.

Referring to FIG. 4, the electronic device 100 has the first camera 151 for taking a video or photograph or making a video call at the back thereof (not shown in FIG. 4). The electronic device 100 has the second camera 152 for taking a video or photograph or making a video call at the upper end of the front thereof.

The processor unit 110 of the electronic device 100 controls the display module 171 to output at least one of a video recording window 400 and a call handling window 410. In the following description, it is assumed that the video recording window 400 and the call handling window 410 are simultaneously output.

The video recording window 400 is composed of a phrase indication 401 indicating video recording, a recording pause/stop button 402, a recording pause button 403, a call sound insert button 404, and a video sound insert button 405. The processor unit 110 controls the display module 171 to output the phrase indication 401 indicating video recording on the video recording window 400.

When the recording pause/stop button 402 is selected by the user, the processor unit 110 controls the first camera 151 and second camera 152 to pause or stop video recording. When the recording pause button 403 is selected by the user, the processor unit 110 controls the first camera 151 and second camera 152 to pause video recording.

The call sound insert button 404 is used to start or stop inserting a call sound during video recording. When the user selects the call sound insert button 404 to stop call sound insertion, the processor unit 110 controls the voice signal selection module 121 of the sound manager 120 to select the voice signal other than the second voice signal picked up by the second microphone 132 of the input unit 130.

In addition, when the second voice signal from the second microphone 132 is detected without a user's selection, the processor unit 110 may control the voice signal selection module 121 of the sound manager 120 to select the voice signal other than the second voice signal picked up by the second microphone 132 of the input unit 130.

The processor unit 110 controls the voice signal processing module 122 of the sound manager 120 to process the selected voice signals. Here, signal processing may be performed to remove the second voice signal, which is treated as a noise, from the first voice signal. The processor unit 110 controls the video recording module 113 to record a video by use of the processed voice signal.

The video sound insert button 404 is used to start or stop inserting video sound during video recording. When the user selects the video sound insert button 405 to stop video sound insertion, the processor unit 110 records a video without a sound.

The call handling window 410 is composed of an incoming call hold button 411, a call duration indication 412, a counterpart icon 413, a recording button 414, an end call button 415, a dial button 416, and a mute button 417. Here, during a call, when the incoming call hold button 411 is selected, the voice signal from the counterpart user is muted; when the mute button 417 is selected, the voice signal from the user is muted. When a call is in progress with or without recording activated, the processor unit 110 controls the display module 171 to output the duration of the call in progress as shown by the call duration indication 412. The processor unit 110 also controls the display module 171 to output a preset icon indicating the counterpart of the call as shown by the counterpart icon 413.

When the user selects the recording button 414, the processor unit 110 controls the voice signal selection module 121 of the sound manager 120 to select the voice signal of the counterpart user received by the receiver 191 of the mobile communication module 190 and the second voice signal picked up by the second microphone 132 of the input unit 130.

The processor unit 110 controls the voice signal processing module 122 of the sound manager 120 to process the selected voice signals. The processor unit 110 may control the call recording module 112 to record the voice signal processed by the voice signal processing module 122.

In addition, the processor unit 110 may control the file handling module 111 to compress the voice signal processed by the voice signal processing module 122 in order to store the processed voice signal in the memory unit 160. When the recording button 414 is not selected, the processor unit 110 may output the processed voice signal to the sound output module 172.

When the user selects the recording button 414 and the incoming call hold button 411, the processor unit 110 controls the voice signal selection module 121 of the sound manager 120 to select the voice signal other than the voice signal received by the receiver 191 of the mobile communication module 190. The processor unit 110 controls the voice signal processing module 122 of the sound manager 120 to process the selected voice signals.

The processor unit 110 may control the call recording module 112 to record the voice signal processed by the voice signal processing module 122. In addition, the processor unit 110 may control the file handling module 111 to compress the voice signal processed by the voice signal processing module 122 in order to store the processed voice signal in the memory unit 160. When the recording button 414 is not selected, the processor unit 110 may output the processed voice signal to the sound output module 172.

When the user selects the recording button 414 and the mute button 417, the processor unit 110 controls the voice signal selection module 121 of the sound manager 120 to select the voice signal other than the second voice signal picked up by the second microphone 132 of the input unit 130.

The processor unit 110 controls the voice signal processing module 122 of the sound manager 120 to process the selected voice signals. The processor unit 110 may control the call recording module 112 to record the voice signal processed by the voice signal processing module 122. In addition, the processor unit 110 may control the file handling module 111 to compress the voice signal processed by the voice signal processing module 122 in order to store the processed voice signal in the memory unit 160. When the recording button 414 is not selected, the processor unit 110 may output the processed voice signal to the sound output module 172.

When the user selects the end call button 415 during a call or recording the call, the processor unit 110 may deactivate the mobile communication module 190 to end the call. The processor unit 110 may also deactivate the call recording module 112 to end recording the call.

When the user selects the dial button 416, the processor unit 110 controls the display module 171 to output a dial keypad in a partial or full screen format.

Figure 5:
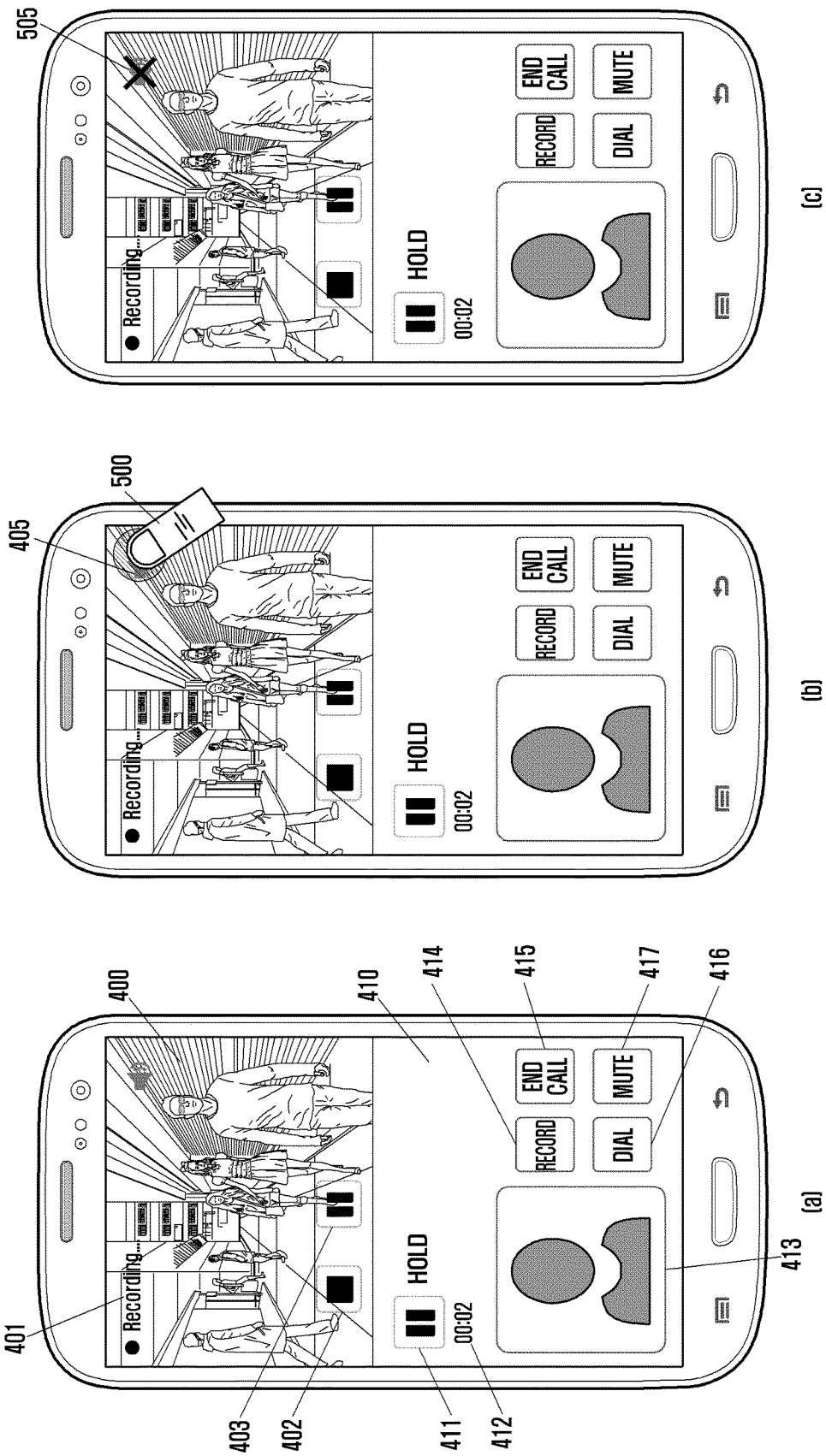
FIG. 5 is screen representations illustrating control of video and call functions according to an embodiment of the present invention.

FIG. 5 is screen representations illustrating control of video and call functions according to an embodiment of the present invention.

As shown in part (a) of FIG. 5, the processor unit 110 of the electronic device 100 controls the display module 171 to simultaneously output the video recording window 400 and the call handling window 410. The video recording window 400 is composed of the phrase indication 401 indicating video recording, the recording pause/stop button 402, the recording pause button 403, and the video sound insert button 405. The call handling window 410 is composed of the incoming call mute button 411, the call duration indication 412, the counterpart icon 413, the recording button 414, the end call button 415, the dial button 416, and the mute button 417.

The user selects the video sound insert button 405 with a finger 500 as shown in part (b) of FIG. 5.

The processor unit 110 then controls the display module 171 to output a modified video sound insert button 505 as shown in part (c) of FIG. 5. The processor unit 110 controls the voice signal selection module 121 of the sound manager 120 to select the voice signal other than the first voice signal picked up by the first microphone 131 of the input unit 130 during video recording.

The processor unit 110 controls the voice signal processing module 122 of the sound manager 120 to process the selected voice signals. Here, signal processing may be performed to remove the second voice signal, which is treated as a noise, from the first voice signal. The processor unit 110 may control the video recording module 113 to record the processed voice signal.

Figure 6:
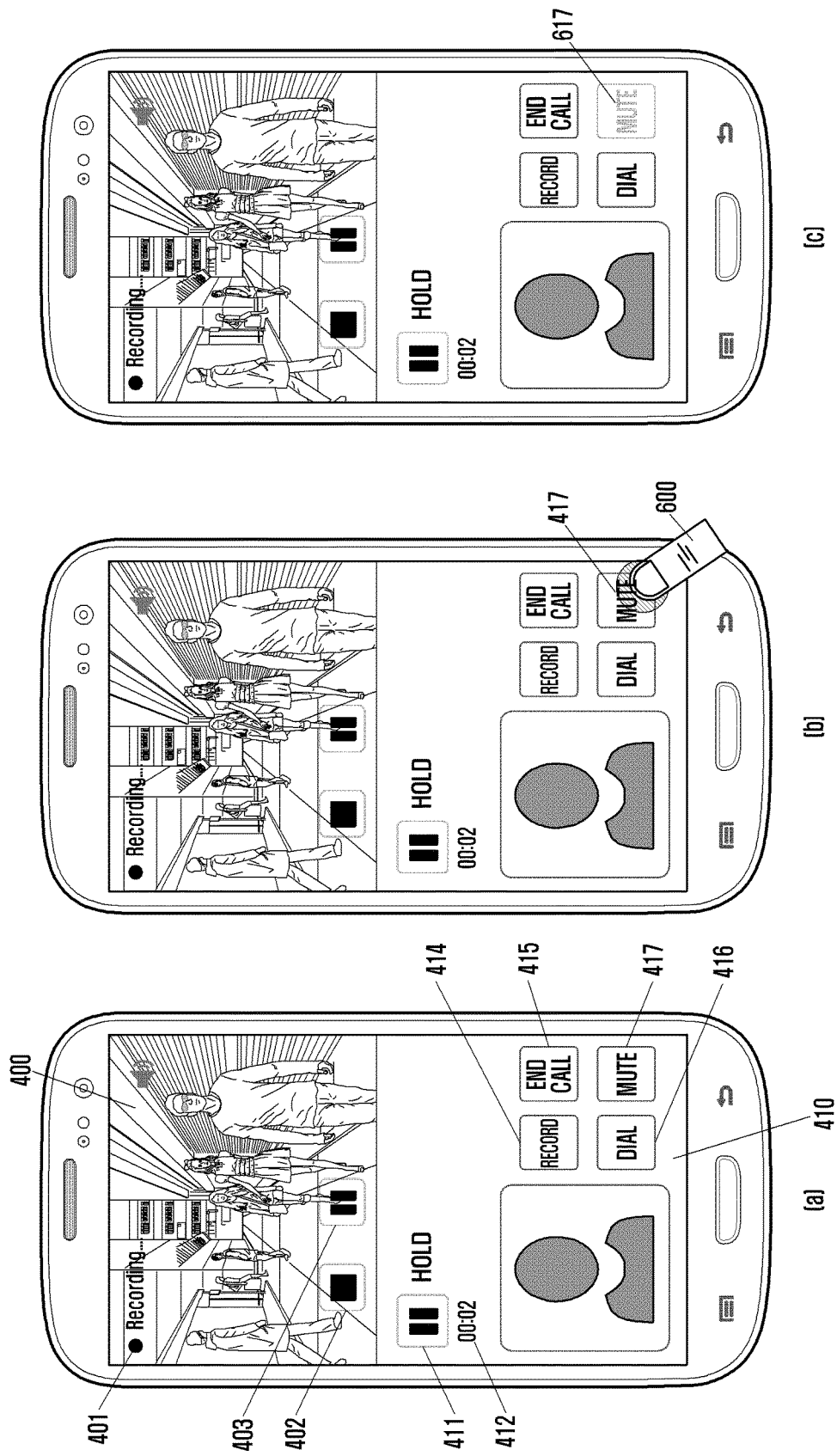
FIG. 6 is screen representations illustrating control of video and call functions according to another embodiment of the present invention.

FIG. 6 is screen representations illustrating control of video and call functions according to another embodiment of the present invention.

As shown in part (a) of FIG. 6, the processor unit 110 of the electronic device 100 controls the display module 171 to simultaneously output the video recording window 400 and the call handling window 410. The video recording window 400 is composed of the phrase indication 401 indicating video recording, the recording pause/stop button 402, the recording pause button 403, and the video sound insert button 405. The call handling window 410 is composed of the incoming call hold button 411, the call duration indication 412, the counterpart icon 413, the recording button 414, the end call button 415, the dial button 416, and the mute button 417.

The user selects the mute button 417 with a finger 600 as shown in part (b) of FIG. 6.

The processor unit 110 then controls the display module 171 to output a modified mute button 617 as shown in part (c) of FIG. 6. The processor unit 110 controls an operation so as not to send the second voice signal to the sender 192 of the mobile communication module 190 communicating with another electronic device. In response to a selection of the recording button 414, the processor unit 110 may control the file handling module 111 to store the voice signal received by the receiver 191 of the mobile communication module 190 as a file. The processor unit 110 may also control the sound output module 172 to output the voice signal received by the receiver 191 of the mobile communication module 190.

Figure 7:
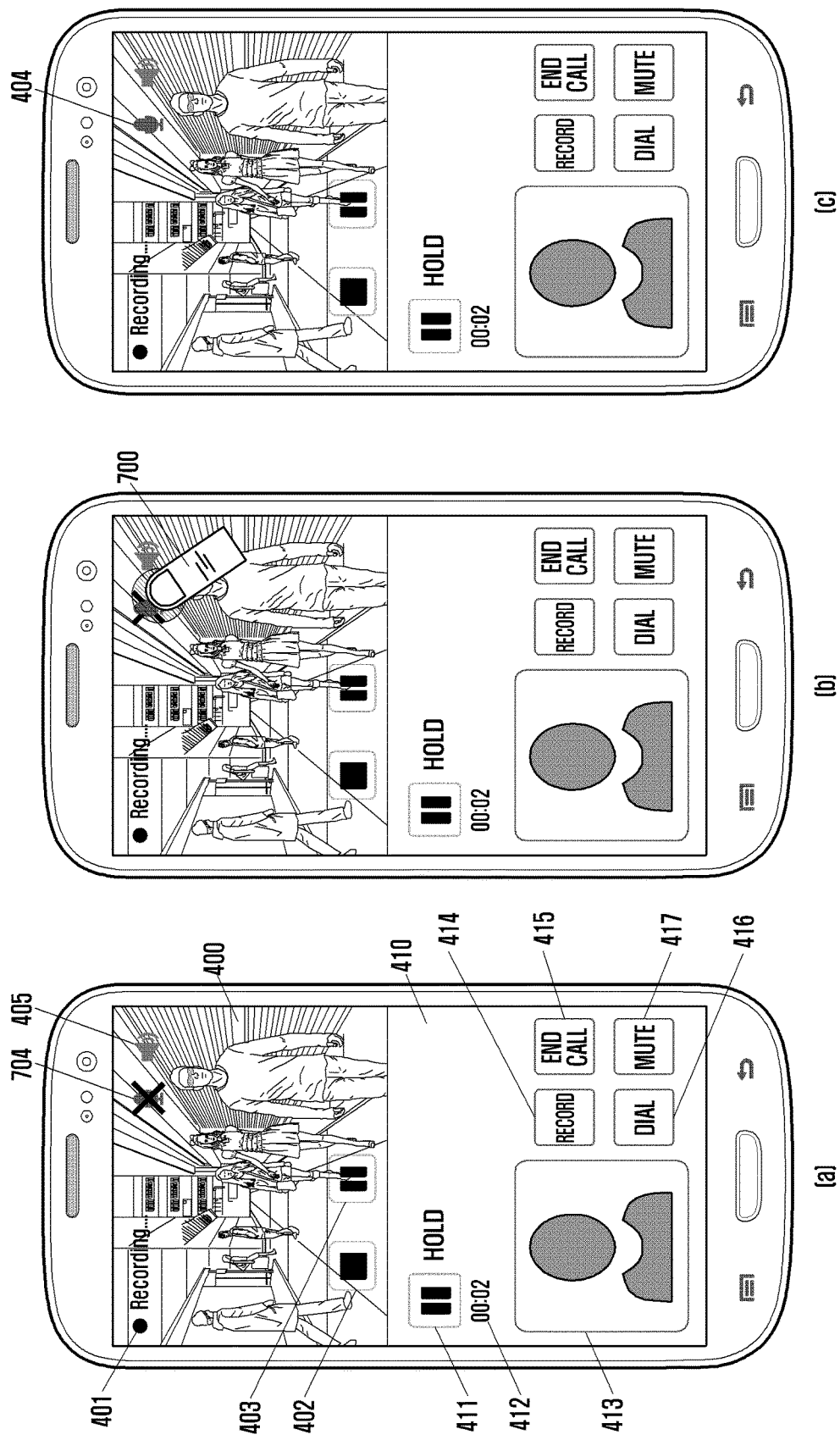
FIG. 7 is screen representations illustrating control of video and call functions according to another embodiment of the present invention.

FIG. 7 is screen representations illustrating control of video and call functions according to another embodiment of the present invention.

As shown in part (a) of FIG. 7, the processor unit 110 of the electronic device 100 controls the display module 171 to simultaneously output the video recording window 400 and the call handling window 410. The video recording window 400 is composed of the phrase indication 401 indicating video recording, the recording pause/stop button 402, the recording pause button 403, a call sound insert button 704 modified upon a selection, and the video sound insert button 405. The call handling window 410 is composed of the incoming call mute button 411, the call duration indication 412, the counterpart icon 413, the recording button 414, the end call button 415, the dial button 416, and the mute button 417.

The user selects the call sound insert button 704 with a finger 700 as shown in part (b) of FIG. 7.

The processor unit 110 then controls the display module 171 to output the original call sound insert button 404 as shown in part (c) of FIG. 7. The processor unit 110 controls the voice signal selection module 121 of the sound manager 120 to select the first voice signal picked up by the first microphone 131. The processor unit 110 may control the voice signal processing module 122 of the sound manager 120 to remove the second voice signal picked up by the second microphone 132 from the first voice signal picked up by the first microphone 131. The processor unit 110 may control the video recording module 113 to record a video by use of the voice signal processed by the sound manager 120.

Figure 8:
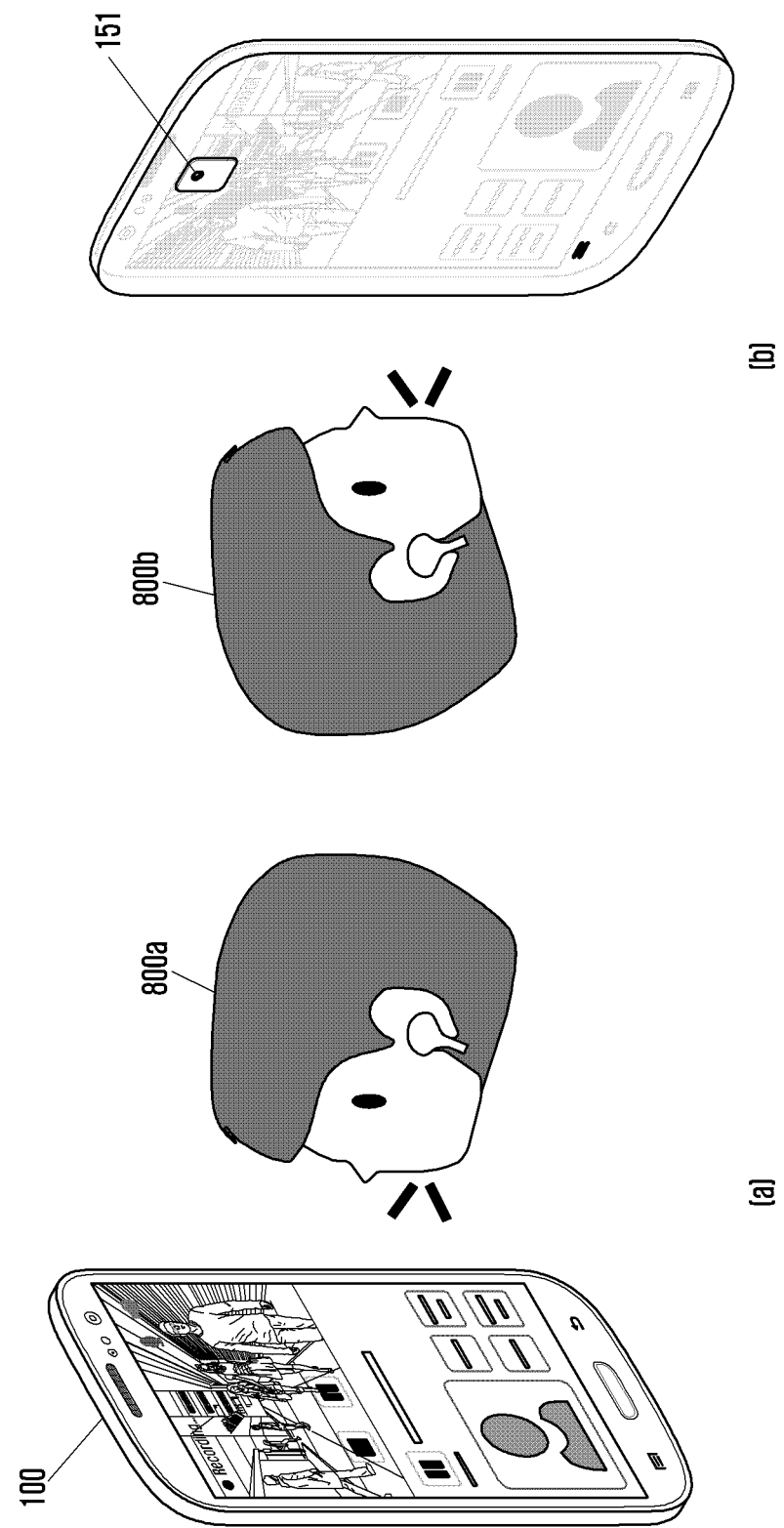
FIG. 8 illustrates control of video and call functions along with user position recognition according to an embodiment of the present invention.

FIG. 8 illustrates control of video and call functions along with user position recognition according to an embodiment of the present invention.

The processor unit 110 of the electronic device 100 controls the sound manager 120 not only according to a user's selection but also according to the relative position of the user identified using the sensor unit 140.

As shown in part (a) of FIG. 8, the processor unit 110 recognizes that the user 800a is in the front of the electronic device 100 (i.e. views the display unit 131) by use of the sensor unit 140. In this case, the processor unit 110 controls the sound manager 120 to perform voice signal processing by removing the second voice signal picked up by the second microphone 132 from the first voice signal picked up by the first microphone 131.

As shown in part (b) of FIG. 8, the processor unit 110 recognizes that the user 800b is in the back of the electronic device 100 (i.e. looks at the first camera 151) by use of the sensor unit 140. The processor unit 110 may be regarded as controlling the first camera 151 to record a video. In this case, the processor unit 110 controls the sound manager 120 to select and process the first voice signal picked up by the first microphone 131. The processor unit 110 may ignore the voice signal picked up by the second microphone 132 or may turn off the second microphone 132. The processor unit 110 may control the sound manager 120 to process the first voice signal or the second voice signal containing the first voice signal picked up by the second microphone 132.

The processor unit 110 may also ignore the voice signal picked up by the first microphone 131 or may turn off the first microphone 131.

In addition, the processor unit 110 may control the sound manager 120 to process the first voice signal and second voice signal picked up by a third microphone (not shown). Here, the third microphone can pick up the first voice signal and second voice signal. The processor unit 110 may control the display module 171 to output an icon indicating a voice signal selection performed by the sound manager 120 according to the relative position of the user. Control of video and call functions along with user position recognition may be applied to other situations.

Figure 9:
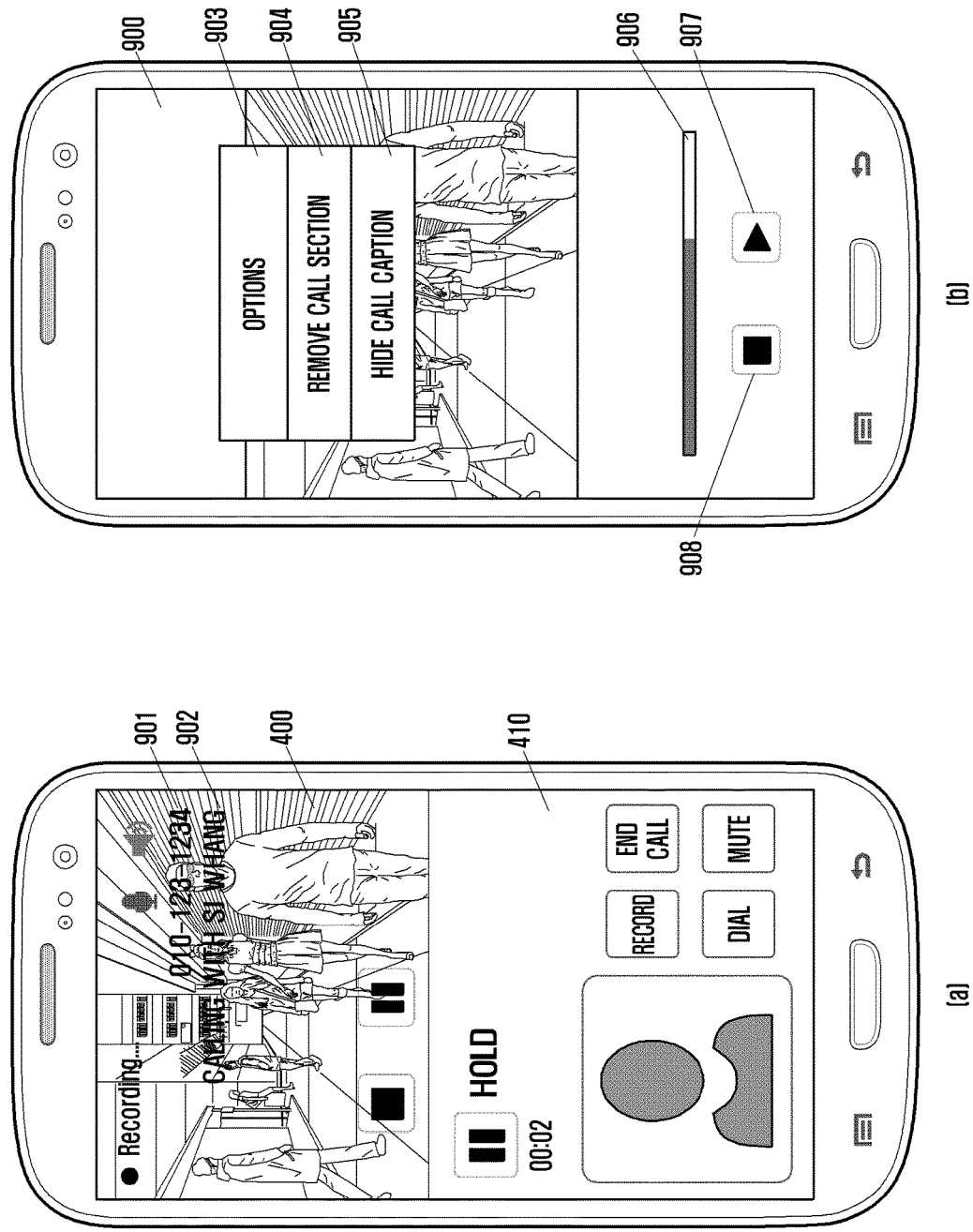
FIG. 9 is screen representations illustrating control of video and call functions according to another embodiment of the present invention.

FIG. 9 is screen representations illustrating control of video and call functions according to another embodiment of the present invention.

As shown in part (a) of FIG. 9, the processor unit 110 of the electronic device 100 controls the display module 171 to simultaneously output the video recording window 400 and the call handling window 410. The video recording window 400 includes a counterpart number indication 901 and a counterpart name and status indication 902.

The processor unit 110 may control the display module 171 to output the counterpart number indication 901 and the counterpart name and status indication 902 as a call caption. Here, the call caption may further include information on the caller's name, dialog subject and call status. The processor unit 110 may control the video recording module 113 to store the call caption together with the video.

As shown in part (b) of FIG. 9, during video recording, the processor unit 110 controls the display module 171 to output a video editing window 900 in a full or partial screen format. The processor unit 110 outputs an editing window in the video editing window 900. The editing window includes an option button 903, a remove call section button 904, and a hide call caption button 905.

The processor unit 110 may store information on the start time, end time and duration time of a call in the memory unit 160. For example, the processor unit 110 may record the start time, end time and duration time of a call in the metadata of a video. It is possible to delete or edit images recorded during a call. When the user selects the remove call section button 904, the processor unit 110 controls the video recording module 113 to remove images or call related information, which are recorded during the call and stored in the metadata, from the video.

When the user selects the hide call caption button 905, the processor unit 110 controls the display module 171 to hide the call caption, which is output together within the video recording window. The processor unit 110 may also control the video recording module 113 not to store the call caption together with the video. The video editing window 900 may further include a recording progress bar 906, a video playback button 907, and a recording pause/stop button 908.

Figure 10:
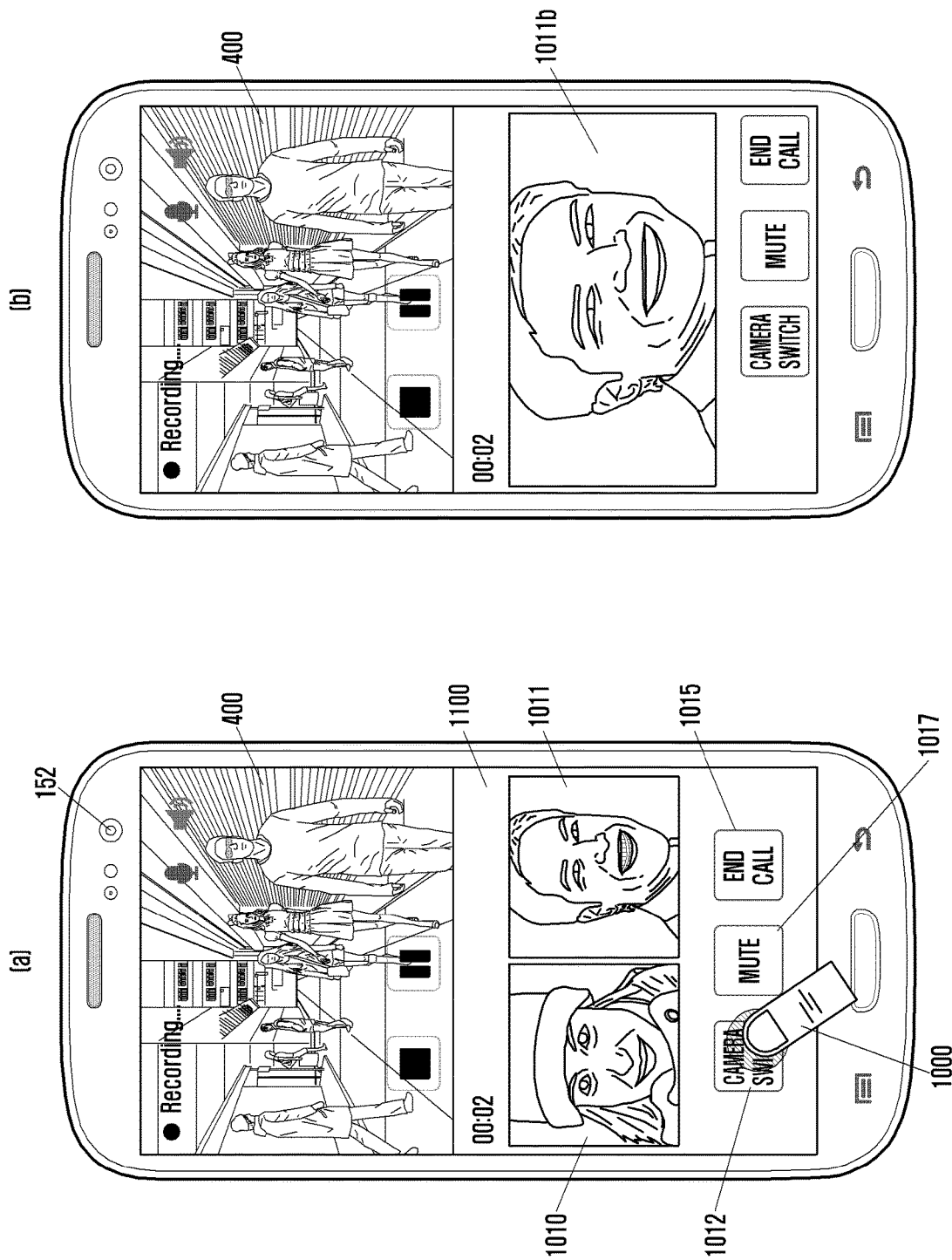
FIG. 10 is screen representations illustrating control of video and call functions according to another embodiment of the present invention.

FIG. 10 is screen representations illustrating control of video and call functions according to another embodiment of the present invention.

As shown in part (a) of FIG. 10, the processor unit 110 of the electronic device 100 operates the first camera 151 and second camera 152 at the same time. The processor unit 110 may make a video call according to a user's selection. The processor unit 110 controls the display module 171 to output the video recording window 400 and a video call window 1100. The video call window 1100 includes a user image 1010 captured by the second camera 152, a counterpart image 1011 received through the wireless communication unit 180, a camera switch button 1012, a mute button 1017, and an end call button 1015.

In response to a user's selection for making a video call, the processor unit 110 operates the second camera 152. The processor unit 110 may control the display module 171 to output an image of the user captured by the second camera 152 as shown in the user image 1010. The processor unit 110 may also control the display module 171 to output an image of the counterpart user received through the wireless communication unit 180 as shown in the counterpart image 1011.

The processor unit 110 may control the voice signal selection module 121 of the sound manager 120 to select the voice signals other than the second voice signal picked up by the second microphone 132. The processor unit 110 may control the voice signal processing module 122 of the sound manager 120 to process the selected voice signals. The processor unit 110 may control the video recording module 113 to record a video by use of the processed voice signals. In such a way, the second voice signal may be removed from the video taken by the first camera 151.

The processor unit 110 may control the voice signal selection module 121 of the sound manager 120 to select the second voice signal picked up by the second microphone 132. The processor unit 110 may control the voice signal processing module 122 of the sound manager 120 to process the selected voice signal. The processor unit 110 may transfer the voice signal processed by the sound manager 120 to the sender 192 of the mobile communication module 190.

The processor unit 110 identifies the position of the user on the basis of a user's selection of the camera switch button 1012, a sensing result of the sensor unit 140, or face recognition of the camera unit 150. Upon determining that the user faces the first camera 151, the processor unit 110 controls the voice signal selection module 121 of the sound manager 120 to select the first voice signal picked up by the first microphone 131. The processor unit 110 may control the voice signal processing module 122 of the sound manager 120 to process the selected voice signal.

The processor unit 110 may control the video recording module 113 to record a video by use of the processed voice signal. The processor unit 110 may transfer the processed voice signal to the sender 192 of the mobile communication module 190. Alternatively, the processor unit 110 may control the sound manager 120 to process the second voice signal picked up by the second microphone 132 and the first voice signal picked up by the first microphone 131, and transfer the processed voice signal to the sender 192 of the mobile communication module 190. The processor unit 110 may determine whether to add the second voice signal picked up by the second microphone 132 to the first voice signal picked up by the first microphone 131 according to a user's selection of the call sound insert button 404.

When the user selects the mute button 1017, the processor unit 110 controls the voice signal selection module 121 of the sound manager 120 to select the voice signal other than the second voice signal picked up by the second microphone 132 of the input unit 130. The processor unit 110 may control the voice signal processing module 122 of the sound manager 120 to process the selected voice signals. The processor unit 110 may control the call recording module 112 to record the voice signal processed by the voice signal processing module 122. When the recording button 414 is not selected, the processor unit 110 may output the processed voice signal to the sound output module 172.

When the user selects the end call button 1015, the processor unit 110 may deactivate the mobile communication module 190.

Upon determining that the user faces the first camera 151, the processor unit 110 controls the display module 171 not to output the user image 1010 captured by the second camera 152, because only the first camera 151 can capture an image of the user. The processor unit 110 may control the display module 171 to display call mode buttons and recording mode buttons in an integrated manner.

As shown in part (b) of FIG. 10, the processor unit 110 controls the display module 171 not to output the user image 1010 captured by the second camera 152 in the video call window 1100. The processor unit 110 controls the display module 171 to output only a counterpart image 1011*b* received through the wireless communication unit 180.

Figure 11:
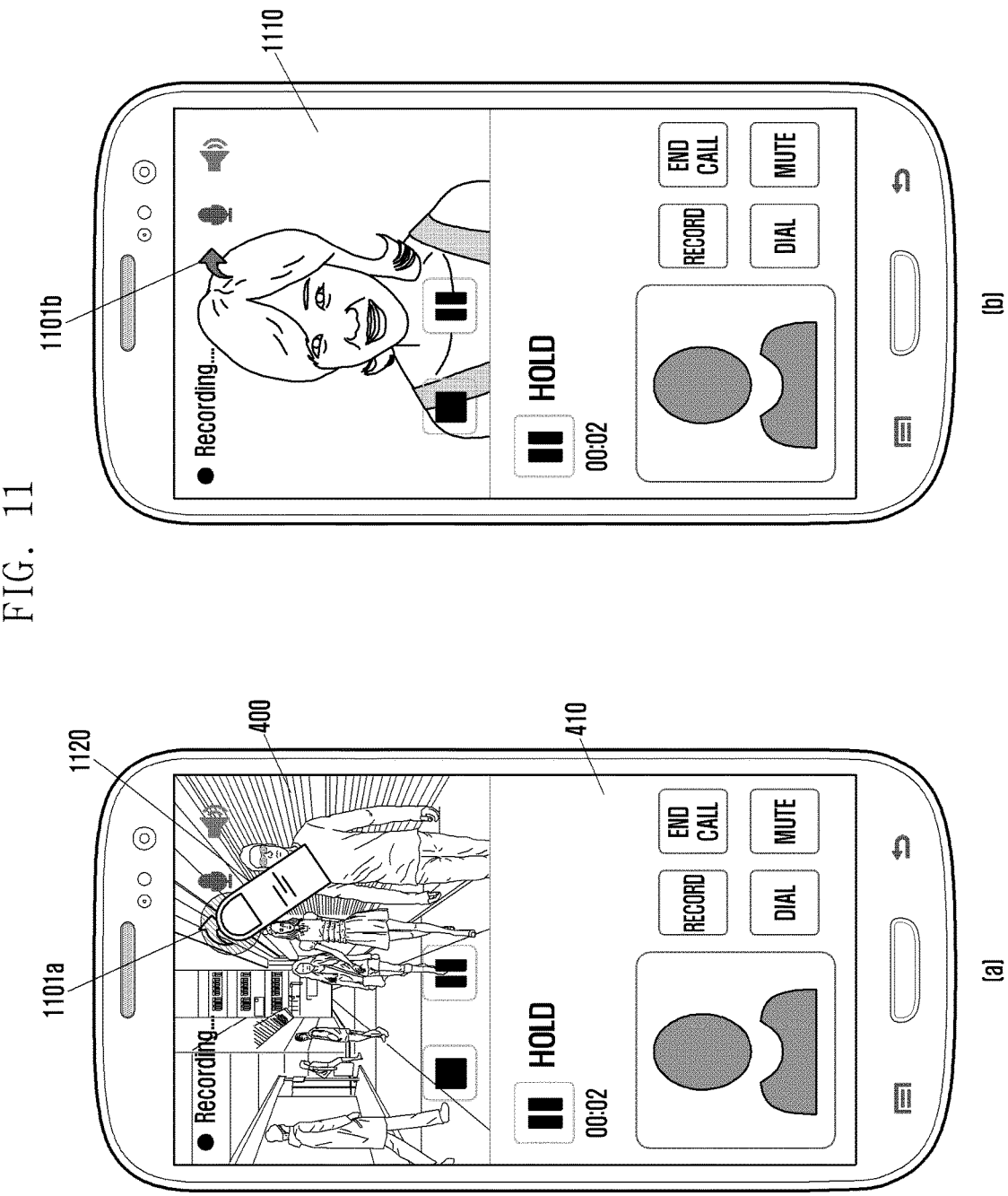
FIG. 11 is screen representations illustrating control of video and call functions according to another embodiment of the present invention.

FIG. 11 is screen representations illustrating control of video and call functions according to another embodiment of the present invention.

Referring to part (a) of FIG. 11, the processor unit 110 controls the voice signal selection module 121 of the sound manager 120 to select the voice signal other than the second voice signal picked up by the second microphone 132. The processor unit 110 may control the voice signal processing module 122 of the sound manager 120 to process the selected voice signals.

The processor unit 110 may control the video recording module 113 to record a video by use of the processed voice signal and images captured by the first camera 151. In response to a user's selection of a camera switch button 1101*a* during video recording, the processor unit 110 deactivates the first camera 151 and activates the second camera 152. In addition, the processor unit 110 may deactivate the first microphone 131 and activate the second microphone 132 or the third microphone capable of picking up the first and second voice signals.

Referring to part (b) of FIG. 11, the processor unit 110 controls the voice signal selection module 121 of the sound manager 120 to select the second voice signal picked up by the second microphone 132. The processor unit 110 may control the voice signal processing module 122 of the sound manager 120 to process the selected voice signal. The processor unit 110 may control the video recording module 113 to record a video by use of the processed voice signal and images captured by the second camera 152. The processor unit 110 controls the display module 171 to output the image captured by the second camera 152 in a video recording window 1110. The processor unit 110 may control the video recording module 113 to perform video recording in a continuous manner during camera switching.

Figure 12:
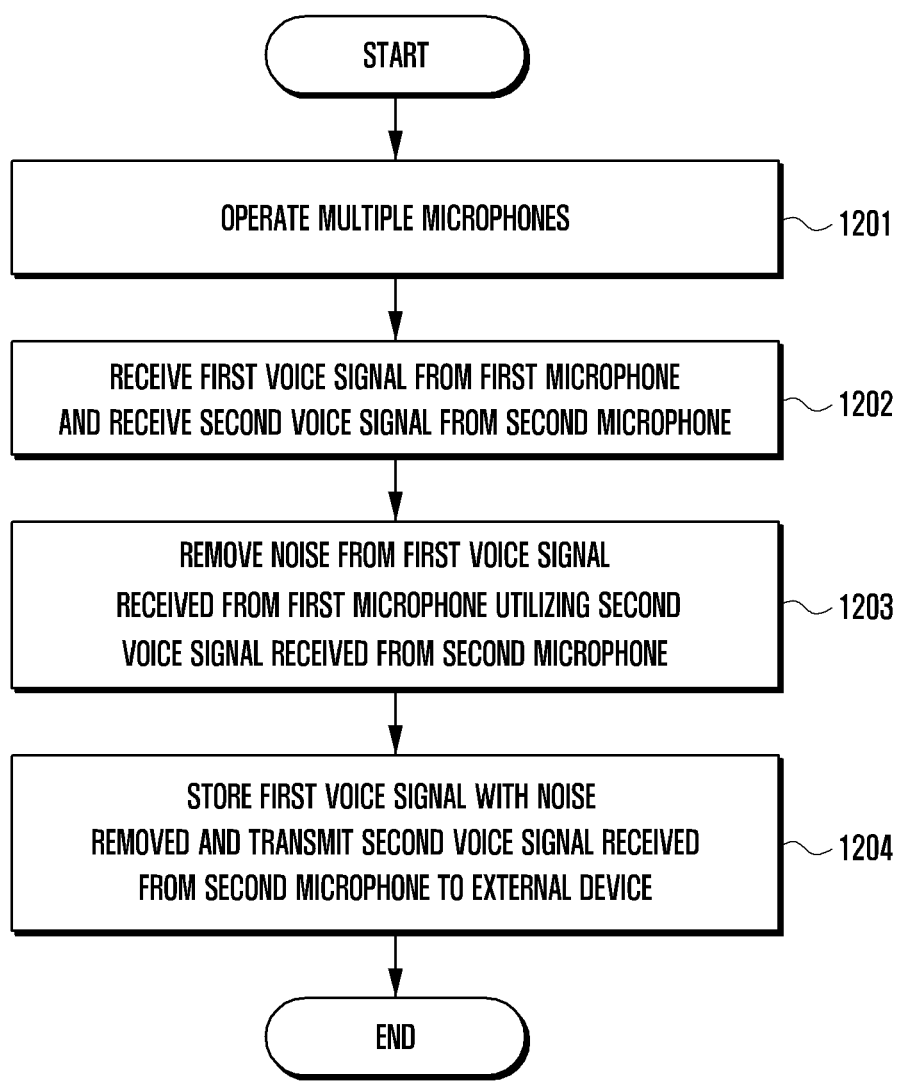
FIG. 12 is a flowchart of a method for controlling video and call functions according to an embodiment of the present invention.

FIG. 12 is a flowchart of a method for controlling video and call functions according to an embodiment of the present invention.

Referring to FIG. 12, at operation 1201, the processor unit 110 of the electronic device operates multiple microphones including first and second microphones 131 and 132. At operation 1202, the processor unit 110 receives a first voice signal picked up by the first microphone 131 and a second voice signal picked up by the second microphone 132. At operation 1203, the processor unit 110 removes a noise from the first voice signal picked up by the first microphone 131 utilizing the second voice signal picked up by the second microphone 132. This is, the second voice signal is considered to a noise for the first voice signal and is removed from the first voice signal, which contains the second voice signal.

At operation 1204, the processor unit 110 stores the first voice signal with a noise removed in the memory unit 160, and controls the sender 192 of the mobile communication module 190 to transmit the second voice signal to an external device.

According to various embodiments of the present invention, a control method for an electronic device may include: operating a first microphone and a second microphone; receiving a first voice signal picked up by the first microphone and a second voice signal picked up by the second microphone; selecting at least one of the voice signals; storing the selected voice signal; and sending the second voice signal picked up by the second microphone to a communication module. Here, selecting at least one of the voice signals may comprise selecting one of the first voice signal, the second voice signal, and a voice signal obtained by removing signal components related to a portion of the second voice signal from the first voice signal. Removing the signal components related to the portion of the second voice signal from the first voice signal may comprise removing the signal components, which are the same as the second voice signal having noise characteristics, from the first voice signal.

In a feature of the present invention, when video and call functions are executed at the same time, the electronic device may process voice signals received through at least two microphones and selectively store one of the voice signals without interference and distortion.

The method according to the invention as described above may be implemented as a program command which can be executed through various computers and recorded in a computer-readable recording medium. Further, the program instructions may be specially designed and constructed, and may be well known and used by those skilled in the art of computer software. Further, the storage medium may include a hardware device such as a hard disk, a floppy disk, a magnetic media such as a magnetic tape, an optical media such as a Compact Disc Read Only Memory (ROM) (CD-ROM) and DVD, a magneto-optical media such as a floptical disk, a ROM, a Random Access Memory (RAM), and a flash memory. In addition, the program instructions may include high class language codes, which are executed in a computer by using an interpreter, as well as machine codes which are made by a compiler.

The embodiments disclosed in the present specification and drawings are provided merely to readily describe and to help in a thorough understanding of the present invention, but are not intended to limit the scope of the present invention. Therefore, it should be understood that all modifications or modified forms drawn by the technical idea of the present invention in addition to the embodiments disclosed herein are included in the scope of the present invention as defined by the appended claims and their equivalents.

What is claimed is:

1. A method for controlling an electronic device, the method comprising:
   receiving a first voice signal from a first microphone and a second voice signal from a second microphone;
   storing a third voice signal, wherein the third voice signal is obtained by removing signal components related to a portion of the second voice signal from the first voice signal; and
   sending the second voice signal to a communication module.

2. The method of claim 1, wherein the second microphone is placed more closely to a user than the first microphone.

3. The method of claim 1, wherein storing the third voice signal comprises recording a video containing audio data corresponding to the third voice signal.

4. The method of claim 1, wherein storing the third voice signal comprises storing the third voice signal and related information together.

5. The method of claim 4, wherein storing the third voice signal further comprises storing communication specific information as the related information.

6. The method of claim 5, wherein the communication specific information comprises information regarding a call duration time, a counterpart name, a counterpart number, and a call status for a call.

7. The method of claim 1, wherein sending the second voice signal comprises sending the second voice signal to an external device through the communication module while performing video recording.

8. An electronic device, comprising:
   a sensor configured to identify a position of a user;
   a memory configured to store audio signals and moving images;
   an input unit having a first microphone configured to receive a first voice signal and a second microphone configured to receive a second voice signal;
   a camera having a first camera configured to capture an image at a back of the electronic device and a second camera configured to capture an image at a front of the electronic device; and
   a processor configured to control a wireless communication unit having a mobile communication module and a wireless Internet module for video and voice communication between the electronic device and an external electronic device,
   wherein the processor comprises a sound manager that is configured to operate the first microphone and the second microphone, receive the first voice signal from the first microphone and receive the second voice signal from the second microphone, store a third voice signal, and control the wireless communication unit to send the second voice signal to a communication module,
   wherein the third voice signal is obtained by removing signal components related to a portion of the second voice signal from the first voice signal.

9. The electronic device of claim 8, wherein the second microphone is placed more closely to the user than the first microphone.

10. The electronic device of claim 8, wherein the sound manager is further configured to record a video containing audio data corresponding to the third voice signal.

11. The electronic device of claim 8, wherein the sound manager is further configured to store the third voice signal and related information together.

12. The electronic device of claim 11, wherein the sound manager is further configured to store the related information including communication specific information.

13. The electronic device of claim 12, wherein the sound manager is further configured to store the communication specific information including information regarding a call duration time, a counterpart name, a counterpart number, and a call status for a call.

14. The electronic device of claim 8, wherein the sound manager is configured to transmit the second voice signal to an external device through the mobile communication module while performing video recording.

* * * * *